(12) United States Patent
Spahr et al.

(10) Patent No.: US 10,549,575 B2
(45) Date of Patent: Feb. 4, 2020

(54) HUB AND WHEEL

(71) Applicant: DT SWISS INC., Grand Junction, CO (US)

(72) Inventors: Stefan Spahr, Lengnau (CH); Simon Haas, Feldbrunnen (CH)

(73) Assignee: DT SWISS INC., Grand Junction, CO (US)

( * ) Notice: Subject to any disclaimer, the term of this patent is extended or adjusted under 35 U.S.C. 154(b) by 152 days.

(21) Appl. No.: 15/493,851

(22) Filed: Apr. 21, 2017

(65) Prior Publication Data

US 2017/0305189 A1 Oct. 26, 2017

(30) Foreign Application Priority Data

Apr. 26, 2016 (DE) .......................... 10 2016 107 752

(51) Int. Cl.
| | |
|---|---|
| *B60B 1/04* | (2006.01) |
| *B60B 1/00* | (2006.01) |
| *B60B 1/02* | (2006.01) |
| *B60B 27/02* | (2006.01) |

(52) U.S. Cl.
CPC .............. *B60B 1/042* (2013.01); *B60B 1/003* (2013.01); *B60B 1/0246* (2013.01); *B60B 1/041* (2013.01); *B60B 27/023* (2013.01); *B60B 2900/114* (2013.01)

(58) Field of Classification Search
CPC ......... B60B 1/041; B60B 1/042; B60B 1/003; B60B 1/0246; B60B 27/023
See application file for complete search history.

(56) References Cited

U.S. PATENT DOCUMENTS

| 5,429,421 A | 7/1995 | Watson |
| 5,882,088 A | 3/1999 | Yahata |
| 6,409,278 B1* | 6/2002 | Nakajima ............. B60B 1/0223 |
| | | 301/110.5 |
| 7,967,392 B2 | 6/2011 | Meggiolan |

(Continued)

FOREIGN PATENT DOCUMENTS

EP 3112183 A1 * 1/2017 ............. B60B 1/042

OTHER PUBLICATIONS

German Search Report from German Patent Application No. 10 2016 107 752.6, dated Dec. 30, 2016.

(Continued)

*Primary Examiner* — Kip T Kotter
(74) *Attorney, Agent, or Firm* — Greer, Burns & Crain, Ltd.

(57) ABSTRACT

A hub and a wheel having such a hub are provided. The hub includes a hub shell and an axle to rotatably receive the hub shell. The hub shell is provided with circumferential hub flanges serving for accommodation and defined orientation of a plurality of spokes. Each of the spokes has a spoke body and a spoke head. The hub flanges include a plurality of accommodation sections receiving a spoke head each. Each of the accommodation sections has one spoke feed-through assigned to it through which an accommodated spoke can be guided out of the accommodation section. The hub flange includes two different types of accommodation sections. A first type includes a circumferentially closed spoke feed-through and a second type, a circumferentially opened spoke feed-through.

21 Claims, 4 Drawing Sheets

(56) References Cited

U.S. PATENT DOCUMENTS

| | | | | |
|---|---|---|---|---|
| 9,815,322 B2* | 11/2017 | Senoo | ............... | B60B 27/023 |
| 2004/0130204 A1 | 7/2004 | Schlanger | | |
| 2005/0012384 A1* | 1/2005 | Fioravanti | ............ | B60B 1/0223 |
| | | | | 301/55 |
| 2007/0284934 A1 | 12/2007 | Chen | | |
| 2008/0116738 A1* | 5/2008 | Urbani | ............... | B60B 1/041 |
| | | | | 301/110.5 |
| 2008/0129105 A1* | 6/2008 | Urbani | ............... | B60B 1/0246 |
| | | | | 301/57 |
| 2008/0211291 A1 | 9/2008 | Meggiolan | | |
| 2009/0066152 A1* | 3/2009 | You | ............... | B60B 27/023 |
| | | | | 301/106 |

OTHER PUBLICATIONS

European Search Report for corresponding European Application No. 17168258.6, dated May 17, 2018.

* cited by examiner

HUB AND WHEEL

BACKGROUND

The present invention relates to a hub and a wheel for an at least partially muscle-powered two-wheeled vehicle, and in particular to a bicycle.

In the area of sports and also in competitive sports, bicycle components tend to be required which are particularly lightweight while also being very sturdy. Thus, for example wheels having straight or non-cranked spokes have been disclosed offering a low weight combined with high stability. These wheels require hubs having a hub flange suitable to receive straight respectively non-cranked spokes.

The prior art has disclosed hubs whose hub flanges show a plurality of tangential or radial bores. The spokes are inserted through these and retained in the mounted state. To allow ensuring stable accommodation for each spoke, thus also allowing crossed spokes, the flange configuration needs to show a suitable width as a rule. This results in a very inconvenient weight of these hubs.

Another disadvantage of the known hubs is the hub flange diameter that tends to be very large since the straight spokes need space during mounting. Spoking is a particular problem, for example with hubs having a rotor or a brake disk accommodation. Therefore, the hub flanges tend to be configured with a very large diameter in these positions which adversely affects the weight of the hub. Moreover, large or wide hub flanges offer a large surface for wind action and therefore tend to show poor aerodynamics.

Therefore, the prior art has disclosed hubs suitable to accommodate straight spokes while also showing a compact hub flange configuration. To enable ease of spoking, the hub flange is as a rule provided with large-area recesses or multiple-slot configurations. However, this often results in considerable structural weakening of the hub flange.

It is therefore the object of the present invention to provide a hub and a wheel which offer an accommodation for the spokes in the hub flange that is both stable and compact.

SUMMARY

The hub according to the invention is provided with a hub shell. The hub shell is suitable and configured for rotatable arrangement relative to at least one axle that can be, or is, received in the hub shell. The hub shell is provided with at least one circumferential hub flange. The hub flange serves for accommodation and defined orientation of a plurality of spokes. Each of the spokes comprises in particular a spoke body and a spoke head. The spoke head is in particular flattened. The hub flange comprises a plurality of accommodation sections to accommodate one spoke head each. One spoke feed-through is assigned to each of the accommodation sections. The spoke feed-through allows to guide an accommodated spoke out of the accommodation section. The hub flange comprises at least two different types of accommodation sections. A first type comprises a circumferentially closed spoke feed-through. A second type comprises a circumferentially opened spoke feed-through.

The hub according to the invention has many advantages. A considerable advantage is that due to the different accommodation sections, high stability combined with a compact structure of the hub flange is achieved. By way of the different configurations of accommodation sections, a continuous respectively one-sided weakening of the hub flange is avoided. Thus, any influence of one type on the hub flange stability may be compensated by means of the other type, and vice versa. This results in a particular rigid hub flange that withstands high forces as well.

Moreover, the hub flange may be configured having a narrow diameter without complicating insertion of the spokes. Thus, for example a spoke may be placed transverse to its longitudinal direction into the circumferentially opened spoke feed-through. Therefore, the hub flange may moreover be particularly narrow in design. The spokes may be disposed particularly far axially outwardly. Also, there is in particular no material between the two spokes so that the spokes for example may, and preferably do, contact one another. Both these measures contribute to allow the mounting of the axially inwardly spokes to the wheel at an angle that is less steep than is required in other constructions. Moreover, the overall axial wheel stiffness will be particularly high combined with a particularly low weight. Moreover, the hub according to the invention enables a particularly small radial extension of the hub flange so that hub flanges may be realized showing very small diameters so that the weight of the hub can be reduced still further.

Preferably, the accommodation sections are only disposed on one axial side face of the hub flange and in particular on an axially outwardly surface. It is also possible for the accommodation sections to be disposed on both axial side faces of the hub flange. An arrangement on the axially outwardly surface enables particular ease of placing or inserting the spokes. The outside surface is in particular the side face oriented toward an axial end of the hub. It is also preferred for the accommodation sections of both types to be disposed circumferentially, and in particular equally distributed over the circumference of the hub flange.

The different types of accommodation sections are preferably disposed showing at least one offset relative to a peripheral line of the hub flange. In particular, identical types of accommodation sections are disposed along one joint peripheral line. The offset is in particular only provided between different types of accommodation sections. For example, accommodation sections of the second type are disposed relative to the peripheral line axially farther inwardly than are the accommodation sections of the first type. A reversed arrangement is possible.

To this end for example, takeup spaces in which the pertaining accommodation sections are provided may be designed deeper or shallower in the axial direction so as to result in an offset. In particular, the spokes accommodated in the accommodation sections are also disposed at the offset relative to the peripheral line. The offset is in particular also provided for the spoke feed-throughs of the pertaining accommodation sections. Such an offset for example, offers the advantage of allowing the accommodated spokes to be crossed despite the narrow flange width provided. Particularly preferably, the offset is configured such that the accommodated spokes contact one another in the crossing point.

Particularly preferably, the offset is suitable and configured to form-fittingly block in the axial direction at least one spoke accommodated in the second-type accommodation section by way of at least one spoke accommodated in the first-type accommodation section, against emerging from the opened spoke feed-through. Such an offset offers the advantage that the spokes accommodated in the circumferentially open spoke feed-throughs are reliably prohibited from undesired emerging.

The different types of accommodation sections are in particular disposed alternatingly over the hub flange. In particular, is each first-type accommodation section followed by a second-type accommodation section. The alternating disposal of the different types enables particularly good and even compensation of the influence of one type on the stability of the hub flange by way of the other type. It is also possible for one or more first-type accommodation sections to be followed by one or more second-type accommodation sections. This sequence is in particular repeated consistently over the circumference of the hub flange.

The spoke feed-throughs are in particular suitable and configured to at least approximately specify a defined longitudinal orientation for an accommodated spoke. To this end, the spoke feed-throughs preferably show a longitudinal axis aligned at a specific angle to the hub flange. The longitudinal axes of the spoke feed-throughs may, for example be configured radially and/or tangentially.

Particularly preferably, the spoke feed-throughs of at least two accommodation sections disposed adjacent to one another show crossed longitudinal axes. The longitudinal axes are, in particular crossed in an imaginary extension outside of the spoke feed-throughs. The longitudinal axes are in particular crossed so that any spokes accommodated therein may be crossed radially farther outwardly. The crossed longitudinal axes lie in particular on different planes so that the longitudinal axes do not intersect. Other adjacent spoke feed-throughs may be aligned so that the accommodated spokes do not cross. For example, a spoke feed-through shows a crossed longitudinal axis relative to one neighbour and a non-crossed longitudinal axis relative to another neighbour. It is possible to separate from one another the spoke feed-throughs having crossed longitudinal axes by means of at least one accommodation section. It is also possible for a spoke feed-through to show a longitudinal axis crossing with a third or fourth or farther distanced spoke feed-through.

In all the configurations, it is particularly preferred for the hub flange to comprise at least one sink in its top face. The top face is in particular a radially outwardly oriented side face of the hub flange. The sink is in particular configured as at least one recess relative to the radial peripheral line of the hub flange. The sink preferably comprises at least two converging flanks. The flanks may show a straight and/or curved outline. The flanks in particular meet in a deepest point of the sink. Such a sink allows to reduce the weight without unfavorably affecting the required engineering strength or stability.

A deepest point of the sink lies in particular radially beneath a crossing point of the crossed longitudinal axes of the spoke feed-throughs. This enables the spokes to cross at a very flat angle. The spokes crossing at a flat angle offers the advantage of achieving a good induction of force via spokes. It is possible for the crossing point to lie inside the peripheral line of the hub flange. Alternately, the crossing point may lie outside of the peripheral line of the hub flange. It is possible for the distance of the crossing point from the outer peripheral line of the hub flange to correspond to the cross-section of the spoke or to double the cross-section or to a multiple of the cross-section of the spoke.

The deepest point of the sink is preferably disposed centrally between two accommodation sections. It is also possible for the deepest point of the sink to be disposed centrally between two takeup spaces. It is possible for the deepest point of the sink to lie radially above a depression or recess for weight reduction of the hub. It is also possible to provide at least one ridge in the hub flange and for the deepest point of the sink to lie radially above the ridge. It is possible to provide the hub flange with multiple sinks which are symmetrically distributed over the circumference. For example, sinks beneath a crossing point may alternate with sinks above a ridge.

It is possible to configure in the hub flange at least one depression each between adjacent accommodation sections and in particular between accommodation sections comprising spoke feed-throughs with crossed longitudinal axes. The depression is in particular disposed on an axial side face and particularly preferably on an axially outwardly surface of the hub flange. It is also possible for the depression to be provided on an axially inwardly surface. It is possible for a hub flange to have no depression between accommodation sections showing spoke feed-throughs having non-crossed longitudinal axes. Alternately, it is possible to dispose at least one depression therein.

These depressions offer an advantageous weight reduction without adversely affecting stability. A depression between adjacent accommodation sections having spoke feed-throughs with crossed longitudinal axes is particularly advantageous, since the conventional dimensions of wheels provide for spacing between these accommodation sections anyway. This spacing is particularly well suited for a depression since sufficient material is provided in this place. The depression is in particular configured such that it is enclosed by sufficient material for the required stability of the hub flange.

Particularly preferably, each of the spoke feed-throughs of the different types of accommodation sections extend over the top face and only over one of two axial side faces of the hub flange. Alternately, the spoke feed-throughs of the different types of accommodation sections may be disposed on both axial side faces of the hub flange or solely on the top face or on an axial side face. The spoke feed-throughs of the first-type accommodation section in particular extend at least in sections over the top face and the axially inwardly face of the hub flange. The spoke feed-throughs of the second-type accommodation section preferably extend at least in sections over the top face and an axially outwardly surface of the hub flange. A reverse arrangement is also possible. The orientation of the circumferentially opened spoke feed-through at the axially outwardly surface enables particular ease of spoking in particular in the case of a hub flange on the rotor side or on the brake side.

In all the configurations, it is particularly preferred for the circumferentially opened spoke feed-through to be configured as a slot-shaped punched hole. In all the configurations, it is moreover preferred for the circumferentially closed spoke feed-through to be configured as a slotted hole. The punched hole and/or the slotted hole are in particular suitable and configured to allow placing and/or feeding through a spoke head and in particular a flattened spoke head. The slot-shaped punched hole and/or the slotted hole are in particular non-round and preferably oval and/or rectangular in cross-section. It is possible for the rectangular cross-section to show rounded corners. These configurations of spoke feed-throughs may particularly advantageously be employed in wheels having for example hammerhead (T-head) spokes.

The slot-shaped punched hole preferably extends at least in part over the top face and over that axial side face of the hub flange where the pertaining accommodation section is disposed. Preferably, the punched hole in an axially outwardly accommodation section thus extends over the axially outwardly surface and the top face of the hub flange. Then, the punched hole in particular does not extend over the axially inwardly surface as well. This enables particular ease of placing the spoke from axially outwardly in the spoke feed-through. Since the inwardly surface is not provided with any punched holes, the hub flange remains very sturdy in spite of the punched holes. Alternately, the punched hole may be provided on the axially inwardly surface of the hub flange.

The slot-shaped punched hole in particular only extends over part of the top face and in particular not over the entire top face. The advantage thereof is that in spite of the punched hole a wall area of the hub flange remains for taking up the loads.

The slotted hole extends at least partially over the top face and over that axial side face of the hub flange which lies opposite the axial side face with the pertaining accommodation section. The slotted hole extends in particular at least in sections over the top face and the axially inwardly surface of the hub flange. The slotted hole in particular does not extend over the axially outwardly surface. The axially outwardly surface is preferably not provided with a slotted hole. This allows for one, ease of inserting the spokes through the slotted hole and for another the hub flange needs to be slotted in a confined location only. The slotted hole at the axially inwardly surface enables ease and comfort of inserting the spokes even in the case of very small flange diameters. The section length of the slotted hole at the inwardly surface may be matched in dependence on the hub flange diameter.

Particularly preferably, the slotted hole only extends over a section of the axially inwardly surface and/or of the top face and in particular it does not extend over the entire inwardly surface respectively top face. This ensures that in spite of the slotted hole, the material remaining on the axially inwardly surface and on the top face is sufficient for contributing to the stability of the hub flange.

In connection with the punched hole worked into the top face only in sections there is thus obtained a hub flange which is in particular not entirely open in any place for the spoke feed-through. This allows achievement of a very high measure of stability and strength even in hub flanges having a narrow or low configuration.

Particularly preferably, the punched hole and the slotted hole overlap in sections on the top face of the hub flange. The punched hole and the slotted hole in particular extend from the pertaining axial side face at least up to the centre of the top face and particularly preferably beyond the centre of the top face. The punched hole and/or the slotted hole extend in particular over at least 60% and preferably at least 70% and particularly preferably over at least 80% or more of the top face of the hub flange. The punched hole and the slotted hole in particular converge from opposite axial side faces of the hub flange. This allows good offset and a reliable spoke securing device.

It is possible for the length of a section of the slotted hole to be larger on the top face of the hub flange than is the length of a section of the slotted hole on the axial side face and, in particular on the axially inwardly surface of the hub flange. This offers a particularly stable hub flange. Alternately, a larger length on the axially inwardly surface than on the top face is possible. In the case of smaller diameter hub flanges, this allows inserting the spoke from axially inwardly. Such a hub flange is preferably for a front wheel hub and, in particular on the hub flange lying opposite a mounting device for a brake disk.

The width of the slotted hole and/or the width of the punched hole preferably correspond at least to the width of a head of a spoke to be accommodated.

In all the configurations, it is particularly preferred to dispose the accommodation sections at least partially in at least one takeup space. The takeup space is in particular provided by at least one recess in the hub flange. These accommodation sections offer good access to the accommodation sections and moreover they enable an aerodynamically advantageous placement of the spoke heads.

The takeup space is preferably axially open and particularly preferably axially outwardly open. It is also possible for the takeup space to be axially inwardly open.

It is possible for the takeup space to be closed by at least one cover. In particular, can all the takeup spaces of a hub flange be closed by at least one shared cover. The takeup spaces of a hub flange may also be provided with two or more covers. It is also possible to provide at least one cover for each of the takeup spaces.

For example, an annular covering disk may be provided which is disposed on the axially outwardly surface of the hub flange. It may be provided for the cover to be detachably and preferably no-tools detachably disposed on the hub flange. It is also possible for the cover to be fixedly connected with the hub flange. For example, a connection by adhesive bond may be provided, for example a glued joint. Such a cover enables a particularly aerodynamic configuration of the hub flange.

The cover may also be fixedly or detachably disposed on the axle. The cover may for example be part of a limit stop that is non-rotatably or rotatably disposed on the axle and/or is attached, pushed on, or pushed in, or inserted into the axle. The cover is in particular rotatably supported relative to the hub shell. The cover is preferably non-rotatably attached to the axle and/or the limit stop. The cover and the limit stop may be configured as one piece. Alternately, the cover may be disposed at, or be part of, a rotor. Alternately, the cover may be attached to the hub shell.

The takeup space is in particular enclosed by at least one axial backwall and by at least one at least partially circumferential sidewall. A circumferential sidewall forms a peripheral wall. The backwall is in particular provided by the axially outer wall of the hub flange ("bottom of the takeup space"). The sidewall extends in particular transverse to the backwall. The sidewall is in particular configured circumferential such that it is penetrated only by the spoke feed-through. The configuration with a backwall and a sidewall extending transverse thereto provides an easily accessible takeup space. Moreover, high stability of the hub flange is ensured even under dynamic loads and stresses.

The sidewall particularly preferably provides a radially extending ridge at least in sections. Such a ridge enables advantageous reinforcing of the hub flange as regards the expected tractive forces by the spokes. Particularly preferably, the sidewalls of adjacent takeup spaces provide at least one radially extending ridge.

It is possible that the depressions serving for weight reduction are also enclosed by at least one sidewall. Then, preferably the sidewall of the depression and the sidewall of an adjacent takeup space provide at least one ridge. The hub flange is in particular provided with a plurality of takeup spaces and/or depressions enclosed by a sidewall each. The sidewalls form at least partially together a plurality of ridges in the hub flange. It is also possible for the sidewall to provide a tangentially extending ridge at least in sections. Particularly preferably, the hub flange does not show any circumferential groove and/or circumferential recess on the axial side faces and/or on the radial side face. An entirely circumferential groove may inadmissibly weaken the engineering strength of the hub flange.

In an advantageous configuration, at least some of the accommodation sections are preferably arranged singly in one takeup space each. In another configuration, at least some of the accommodation sections are preferably provided in pairs in one takeup space each. In a particularly preferred configuration, the hub may be provided with both takeup spaces having one accommodation section only and takeup spaces having pairs of accommodation sections. Takeup spaces having three or four or more accommodation sections are also conceivable. The quantity of the accommodation sections in the takeup spaces is preferably specified taking into account the expected forces acting on the hub flange, for example depending on whether the wheel is or is not driven.

A hub is in particular provided comprising at least one hub flange having takeup spaces solely showing pairs of accommodation sections. This configuration is in particular provided for a hub flange whose diameter is reduced over another hub flange of the hub. The hub in particular comprises at least one hub flange having takeup spaces in which the accommodation sections are solely disposed singly. It is preferably a hub flange on the rotor side and/or brake side that is so configured.

Preferably the accommodation sections disposed in pairs in a takeup space comprise different types of accommodation sections. In this way a particularly balanced relationship of stability to weight is obtained.

Particularly preferably, at least one receiving pocket having at least one undercut is arranged in the takeup space. The receiving pocket is in particular suitable and configured to retain the spoke head and preferably a flattened spoke head non-rotatably. In particular, one receiving pocket is assigned to each of the accommodation sections. The receiving pocket is preferably matched to the cross-section of the spoke head. In particular, the receiving pocket is matched to a cross-section of the spoke head extending in parallel to the longitudinal axis of the spoke. Spokes showing a rounded and in particular non-flattened spoke head may also be provided.

Preferably, the flattened spoke head comprises two curved legs. The legs are in particular convexly curved in at least one axis. The receiving pocket for accommodating the legs shows correspondingly curved sections. Such a receiving pocket achieves even adjoining of the spoke and thus good form-fit and good force introduction.

It is possible for the receiving pocket to be suitable and configured to at least partially deform under the influence of an accommodated spoke. Such deforming occurs in particular if the hub is accommodated in a wheel provided with spokes. This subsequent deforming achieves a particularly close form-fit. The receiving pocket is for example manufactured of an aluminium alloy and the spoke, of a steel alloy.

The receiving pocket preferably comprises at least two opposite placing sections. An accommodated spoke head can in particular be non-rotatably placed against the placing sections by one of its side edges. The opposite placing sections effectively prohibit rotation in both rotational directions. Particularly preferably, at least one placing section is broken by means of the spoke feed-through. The placing section is in particular configured such that the accommodated spoke can be non-rotatably placed by way of a flattened side face of the spoke head.

In particular, the hub flange is suitable and configured to accommodate tangentially aligned spokes. The spokes may be crossed once or else multiple times. Alternately, a radial spoke guide is possible.

Particularly preferably, the hub flange encloses the circumferentially closed spoke feed-through integrally and in particular comprising one single, integral material. The circumferentially closed spoke feed-through is in particular worked into the hub flange in the form of a recess showing a closed circumference. Preferably, a hub flange wall configured as one piece encloses the circumferentially closed spoke feed-through. The hub flange is preferably configured integrally. The hub flange is particularly preferably integrally connected with the hub shell. It is also possible to configure the hub flanges separately and to connect them non-rotatably with the hub shell.

It is preferred for the spoke feed-throughs to extend radially and/or tangentially in the hub flange. The longitudinal axes of the spoke feed-throughs in particular extend in the radial and/or tangential direction in the hub flange. Such a hub enables wheels that are both particularly durable and lightweight.

In a front wheel hub, the longitudinal axes extend in particular e.g. radially. In a hub for a rear wheel, respectively driven wheel the longitudinal axes extend for example tangentially or else partially tangentially and partially radially. The longitudinal axes of the spoke feed-throughs in particular only extend in the radial and/or tangential directions but not in the axial direction in the hub flange. This allows employment of the hub particularly well with non-cranked spokes so as to obtain particularly high stability.

The hub comprises in particular, at least one spoke. The spoke is in particular straight or non-cranked. Alternately, the spoke may be cranked. Preferably the hub comprises at least one spoke having a flattened spoke head. Alternately, at least one spoke having a non-flattened spoke head may be comprised, e.g. an angular, polygonal, round and/or rounded spoke head. The spoke preferably follows the direction of its spoke feed-through. The spoke in particular shows one single spoke body respectively spoke shaft. The spoke is in particular not tied nor attached to another spoke.

Preferably, the hub shell and the at least one hub flange are configured integrally. The hub in particular comprises two hub flanges both of which are preferably integrally connected with the hub shell.

The wheel according to the invention comprises the hub according to the invention described above. The wheel in particular comprises a rim and a plurality of spokes.

The wheel according to the invention also shows many advantages. A particular advantage is offered by the different types of accommodation sections so that on the whole the wheel shows a low weight combined with high stability.

In an advantageous configuration, the wheel comprises a plurality of spokes which are accommodated at the hub. In particular, at least one spoke accommodated in the first-type accommodation section is crossed with at least one spoke accommodated in the second-type accommodation section at least in one crossing point. Particularly preferably, the spoke accommodated in the first type in particular form-fittingly secures the spoke accommodated in the second type from exiting its accommodation section in the axial direction.

This spoke arrangement enables particularly uncomplicated and at the same time efficient securing against inadvertent unscrewing. The spokes accommodated in the first type are disposed in the hub flange in particular axially farther outwardly than are the spokes accommodated in the second type. This is a particular advantage if the second-type accommodation section is configured as a slot-shaped punched hole on the axially outwardly surface of the hub flange. Thus, in spite of the circumferentially open spoke feed-through, the spoke may be prohibited from exiting since it is retained by the other spoke which is itself prohibited from unscrewing due to the closed spoke feed-through.

In another wheel configuration, the spokes are configured as blade spokes having at least one cylindrical shaft section and at least one flattened shaft section. The cylindrical shaft sections are preferably disposed in the crossing points of the spokes. It is possible for the accommodation sections to be configured such that the crossed spokes contact one another in the crossing point. This provides a particularly durable and robust wheel.

The spokes preferably exit from the hub flange in the radial and/or tangential but preferably not in the axial direction. The spokes are in particular straight or non-cranked. This wheel is particularly durable and sturdy. The spokes exit in particular on a radial side face of the hub flange.

The axle may be configured as a conventional axle, or alternately as a through axle.

BRIEF DESCRIPTION OF THE DRAWINGS

Further advantages and features of the present invention can be taken from the description of the exemplary embodiments which will be discussed below with reference to the enclosed figures.

The figures show in.

DETAILED DESCRIPTION

Figure 1:
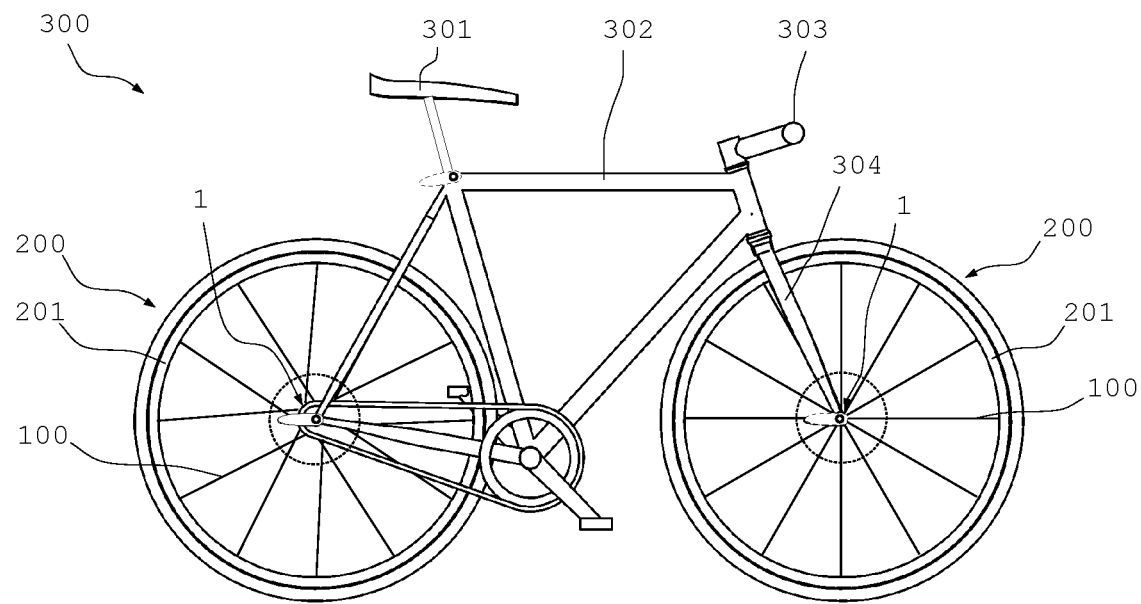
FIG. 1 a schematic side view of a bicycle.
Figure 2:
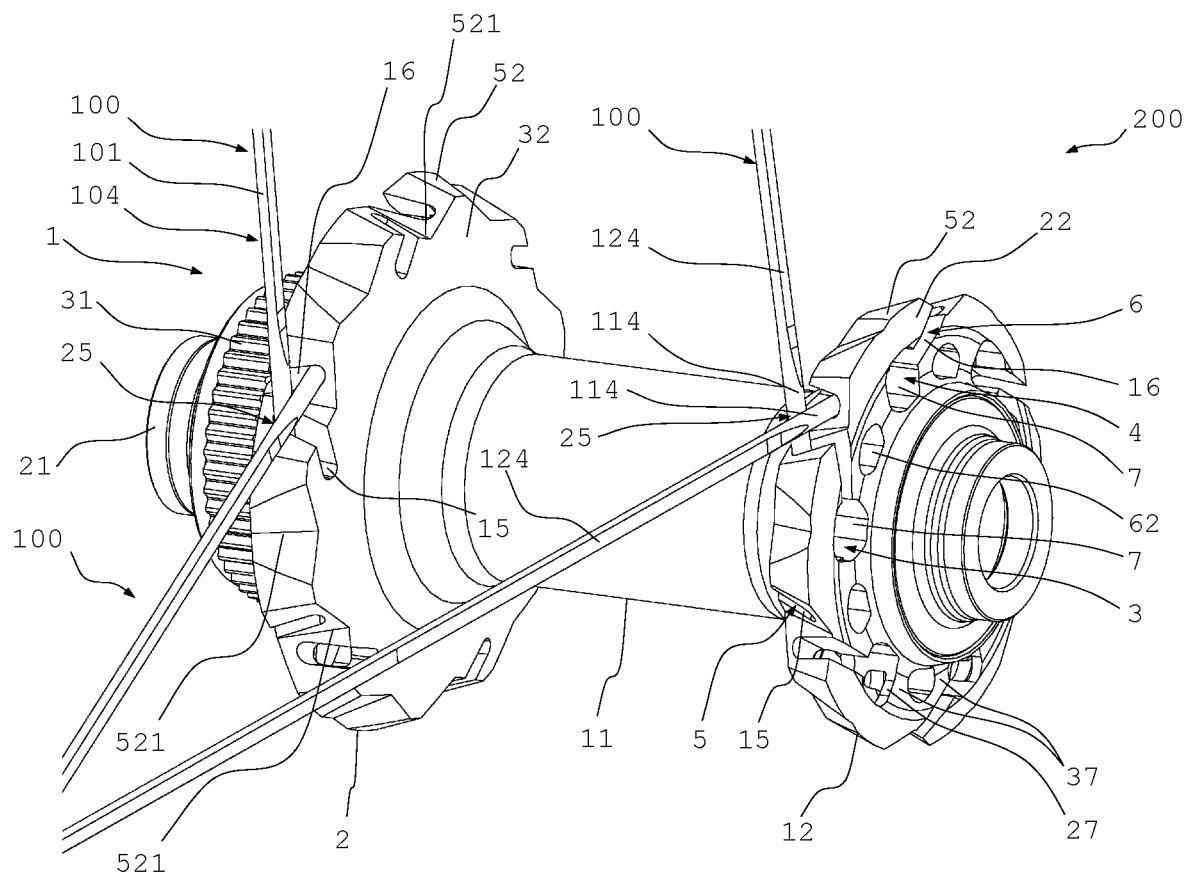
FIG. 2 a schematic illustration of a hub according to the invention in a perspective view.
Figure 3:
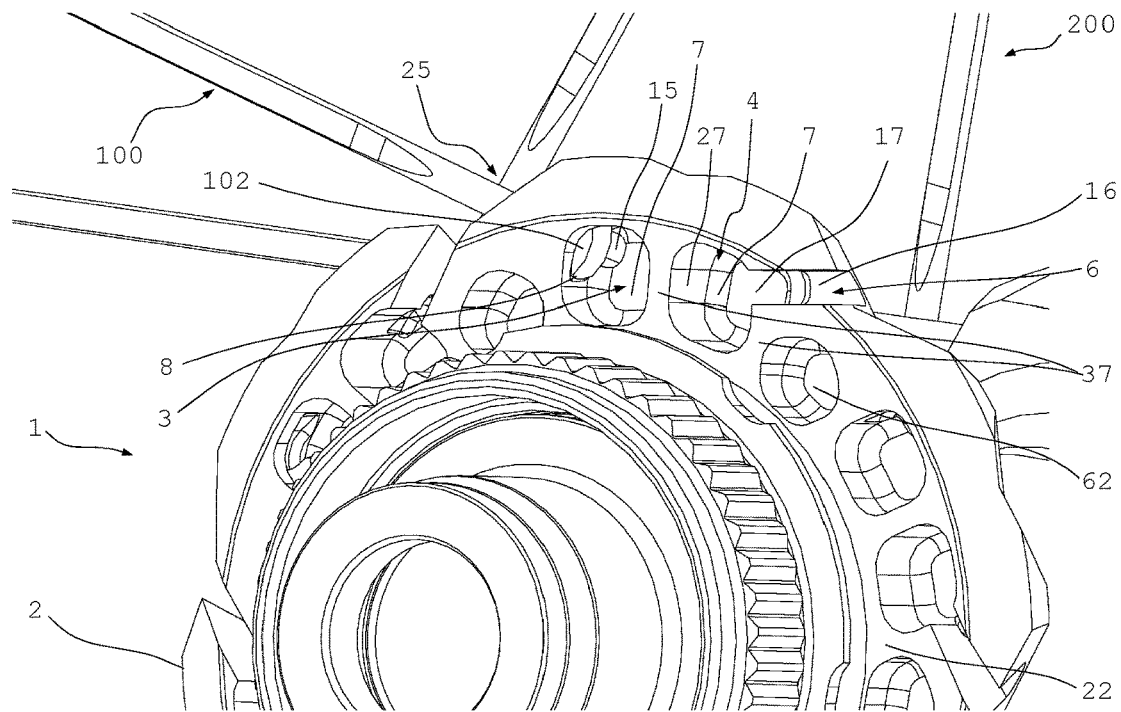
FIG. 3 a schematic detail of the hub in a perspective view.
Figure 4:
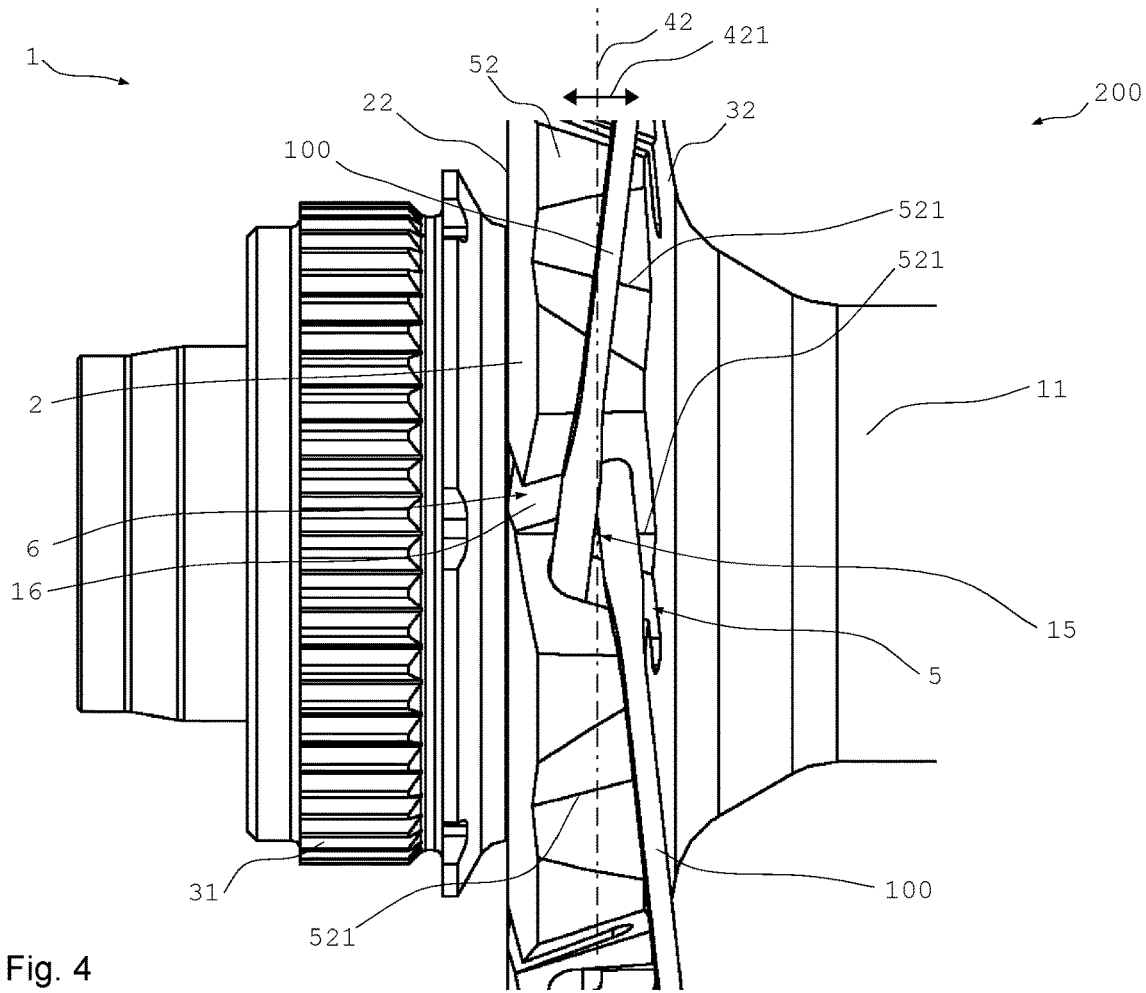
FIG. 4 a schematic detail of the hub in a front view.

FIG. 1 shows a simplistic illustration of a bicycle 300 which in this case is a racing bicycle or a roadster. The bicycle 300 may be configured as a mountainbike and/or a partially muscle-powered two-wheeled vehicle and for example an e-bike. The bicycle 300 comprises two wheels 200 which are equipped with a hub 1 according to the invention.

Furthermore, the bicycle 300 comprises a saddle 301, a frame 302, a handlebar 303 and a fork 304, and further bicycle components. This bicycle 300 comprises a chain-shifting device or derailleur as part of a drive. For a derailleur, the hub 1 may for example comprise a rotor which can accommodate individual sprockets or a cassette respectively. The bicycle 300 further comprises a brake device. To this end, the hubs 1 of the two wheels 200 may be provided with a brake accommodation 31 each for non-rotatably mounting a brake disk.

The wheels 200 configured as a front wheel and a rear wheel are each attached to dropouts of the fork 304 respectively the frame 302.

The wheels 200 each comprise a rim 201 and a plurality of spokes 100. The spokes 100 are fixed to the hub 1 with one of their ends and with the other end, to the rim 201. The spokes 100 shown are configured as straight or non-cranked spokes 100. Blade spokes 104 are preferably provided. The spokes 100 each comprise a spoke body 101 having a flattened spoke head 102, which is received, presently not visible, in the hub 1.

The FIGS. 2 to 8 illustrate various views of a hub 1 according to the invention in detail. The hub 1 may be part of a wheel 200. For better clarity, not all of the spokes 100 provided are illustrated.

The hub 1 comprises two hub flanges 2, 12, received on a hub shell 11. The hub shell 11 is supported rotatably relative to an axle 21 of the hub 1. A brake accommodation 31 is attached to the hub shell 11 for fastening brake disks.

The hub flanges 2, 12 comprise a plurality of accommodation sections 3, 4 for receiving one spoke head 102 each. The hub flanges 2, 12 are configured for receiving non-cranked or straight spokes 100. The spokes 100 emerge from the accommodation sections 3, 4 through a spoke feed-through 5, 6 in the direction of the rim 201.

The spoke feed-throughs 5, 6 have a longitudinal axis that is oriented so as to show a tangential orientation of the spokes 100 in the wheel 200. Alternately, radial spoke insertion may be provided. Moreover, the arrangement of the accommodation sections 3, 4 respectively the orientation of the spoke feed-through 5, 6 are chosen such that a spoke 100 crosses another spoke 100 at least once.

The hub 1 comprises two types of accommodation sections 3, 4. The first-type accommodation section 3 comprises a circumferentially closed spoke feed-through 5. The second-type accommodation section 4 comprises a circumferentially opened spoke feed-through 6. The circumferentially closed spoke feed-through 5 is configured as a slotted hole 15. The circumferentially open spoke feed-through 6 is configured as a slot-shaped punched hole 16.

The accommodation sections 3, 4 are disposed in multiple takeup spaces 7. One of the hub flanges 2 comprises two takeup spaces 7 which comprise one single accommodation section 3, 4 each. The takeup spaces 7 are alternatingly equipped with the first or second type 3, 4.

The opposite hub flange 12 is equipped with takeup spaces 7 in each of which pairs of accommodation sections 3, 4 are disposed. Each of the takeup spaces 7 accommodates one first-type 3 and second-type accommodation section 4. Thus, one slotted hole 15 and one slot-shaped punched hole 16 is assigned to each of the takeup spaces 7 of the hub flange 12. The longitudinal axes of the spoke feed-throughs 5, 6 extend such that the spokes 100 received in a takeup space 7 emerge from the hub flange 12 in opposite directions and thus they are not crossed.

These takeup spaces 7 are configured to be open relative to an axially outwardly side face 22 of the hub flanges 2, 12.

Correspondingly the accommodation sections 3, 4 are only disposed on the axially outwardly surface 22 of the hub flanges 2, 12. Each of these takeup spaces 7 is enclosed by an axial backwall 17 and by a sidewall 27 extending transverse to the backwall 17. The backwall 17 is provided by the axially outwardly surface 22 of the hub flanges 2, 12. The sidewalls 27 enclose the respective takeup spaces 7 and they are broken by the spoke feed-throughs 5, 6 of the accommodation sections 3, 4 disposed in the takeup space 7.

The sidewalls 27 of the takeup spaces 7 provide ridges 37 which extend substantially radially and in particular radially. The sidewalls 27 of adjacent takeup spaces 7 together provide one ridge 37 each.

Depressions 62 are worked into the axially outwardly surface 22 of the hub flanges 2, 12 between the takeup spaces 7 for weight reduction. The depressions 62 are enclosed by a peripheral sidewall 27 and they also form ridges 37 together with the sidewalls 27 of the adjacent takeup spaces 7.

The arrangement of the accommodation sections 3, 4 in a plurality of takeup spaces 7 results in a very stable and sturdy structural architecture of the hub flanges 2, 12. This allows omission of continuous recesses for receiving the spokes 100 which would weaken the overall stability of the hub flanges 2, 12. The enclosing sidewalls 27 and the ridges 37 disposed between the takeup spaces 7 allow good absorption and dissipation of the occurring tractive forces. Since the depressions 62 for weight reduction are likewise enclosed by sidewalls 27 respectively bordered by ridges 37, they also advantageously contribute to stability.

The circumferentially closed spoke feed-throughs 5 extend over part of a radial top face 52 of the hub flange 2, 12 as well as over part of an axially inwardly side face 32.

The spoke feed-throughs 6 configured as slot-shaped punched holes 16 extend over part of the top face 52 as well as over part of the axially outwardly surface 22 of the hub flange 2, 12.

This arrangement of the different types of accommodation sections 3, 4 offers a number of advantages. It is a considerable advantage that the weakening due to the spoke feed-throughs 5, 6 in the hub flange 2, 12 can be distributed to opposite side faces 22, 32. Thus, continuous or one-sided large-surface recesses which would weaken the hub flanges 2, 12 on the whole, may be advantageously dispensed with. Moreover, the quantity of slots or recesses required on one side face 22, 32 of the hub flange 2, 12 can be considerably reduced and distributed over 2 side faces 22, 32.

Therefore, compact hub flanges 2, 12 having small diameters and/or a narrow width may be realized without incurring problems during spoking or even stability problems regarding the hub flanges 2, 12. This also allows saving considerable weight.

The presently shown alternating arrangement of the different types of accommodation sections 3, 4 over the hub flanges 2, 12 is particularly advantageous because a one-sided accumulation of slots is avoided.

Another advantage of different types of accommodation sections 3, 4 is that the hub 1 provides particular ease of spoking. The circumferentially opened spoke feed-through 6 allows simple placement of the spoke 100 transverse to its longitudinal direction.

Figure 5:
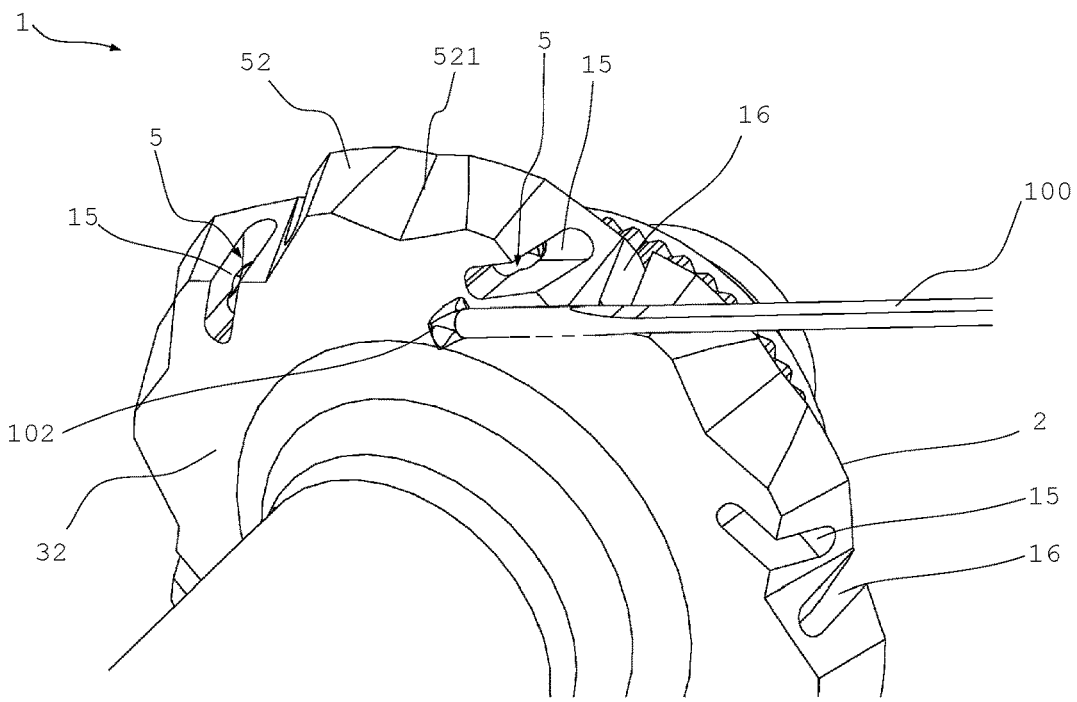
FIG. 5 a schematic detail of the hub in another perspective view.
Figure 6:
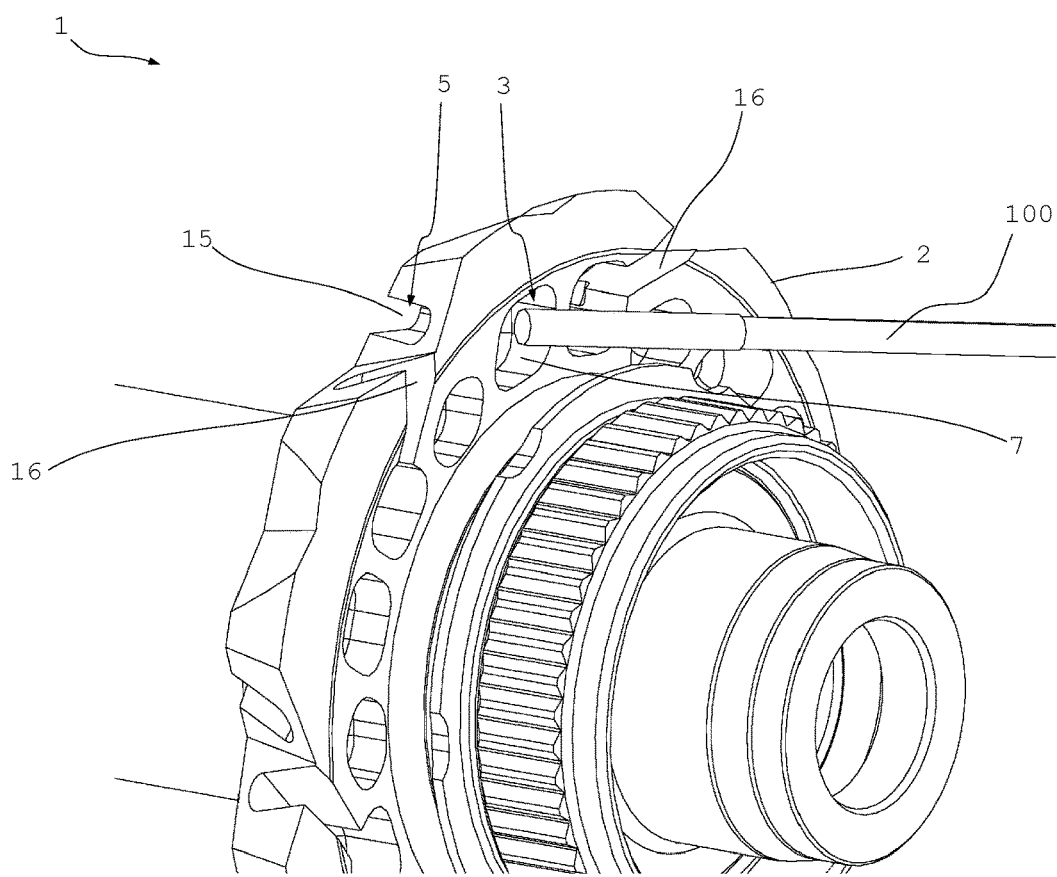
FIG. 6 a schematic detail of the hub in a different perspective view.

The slotted holes 15 extending over the top face 52 and the axially inwardly side face 32 likewise enable particular ease of mounting the spokes 100. As is shown in FIG. 5, the spoke 100 can be inserted from the axially inwardly surface 32. The spoke head 102 is pushed into the takeup space 7 through the spoke feed-through 5. This is a particular advantage in the case of hub flanges 2, 12 whose diameter is small. In the alternative, the spoke 100 may be pushed into the takeup space 7 and through the spoke feed-through 5 with its other end first from the axially outwardly surface 22.

The length of the slotted hole 15 on the top face 52 relative to the length of the slotted hole in the axially inwardly surface 32 is chosen such that the spoke 100 can be inserted at an angle particularly convenient for mounting from the desired axial side face 22, 32.

An arrangement of the different types of accommodation sections 3, 4 at an offset 421 relative to a peripheral line 42 of the hub flange 2, 12 is particularly advantageous. The offset 421 is particularly clearly shown in FIG. 3. In this way, it is possible for the accommodated spokes 100 to be crossed. Moreover, the longitudinal axes of the spoke feed-throughs 5, 6 are provided to be aligned correspondingly.

The crossing spoke 100 prevents the spoke 100 located in the accommodation section 4 from slipping out. The crossing spoke itself is received in the circumferentially closed slotted hole 15 so that it cannot unscrew either.

This mutual spoke securing device of the crossed spokes 100 offers considerable advantages both in bicycle operation and during spoking. For one, unintended unscrewing is prevented if the spokes 100 loosen unintentionally. For another, handling the already placed spokes 100 during spoking is particularly comfortable even if they are not yet fixed in the rim.

It is another advantage of the offset 421 that the crossed spokes 100 can be disposed closely adjacent to one another so as to enable a narrow and thus lightweight hub flange 2, 12 so as to also improve the sturdiness of the wheel 200.

The top face 52 of the hub flange 2, 12 shows sinks 521. They are disposed partially radially beneath a crossing point 25 of the crossed spokes 100 respectively of the crossed longitudinal axes of the pertaining spoke feed-throughs 5, 6. The sinks 521 comprise two converging flanks meeting in the lowest point of the sink 521. The lowest point of the sink 521 lies in the radial direction immediately beneath the crossing point 25 of the spokes 100. This enables a particularly large angle for crossing the spokes 100 which advantageously influences the stability and induction of force into the spokes 100. The hub 1 presently shown allows a crossing point 25 which lies particularly close to or even within the circumference of the hub flanges 2, 12.

The spokes 100 shown are preferably configured as blade spokes 104. The blade spokes 104 comprise a central, flattened shaft section 124 that is enclosed by two cylindrical shaft sections 114. The above described arrangement of the crossing point 25 achieves that the crossing point 25 lies in the region of the cylindrical shaft section 114 of the crossed spokes 100. This shows an advantageous effect on the durability of the wheel 20.

Alternating with the sinks 521 beneath the crossing points 25, further sinks 521 are provided for weight reduction. The different types of sinks 521 are alternatingly disposed over the circumference of the hub flanges 2, 12.

Figure 7:
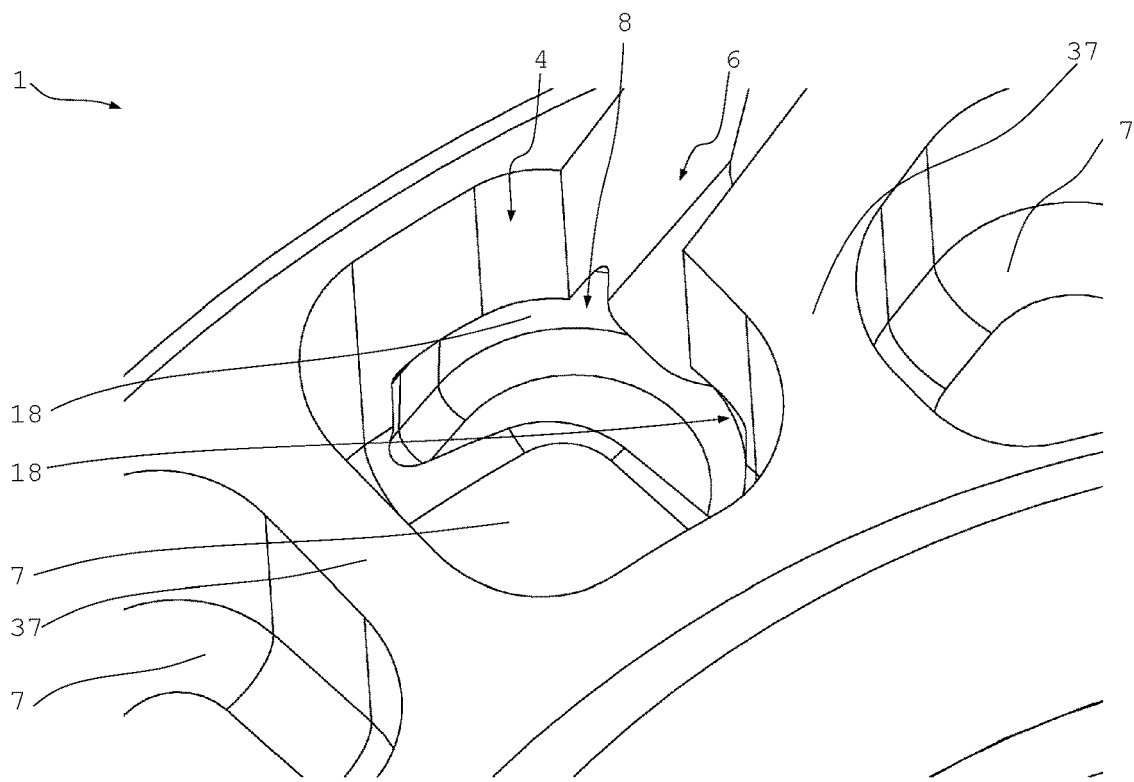
FIG. 7 a schematic detail view of a takeup space of the hub according to the invention in a perspective illustration.
Figure 8:
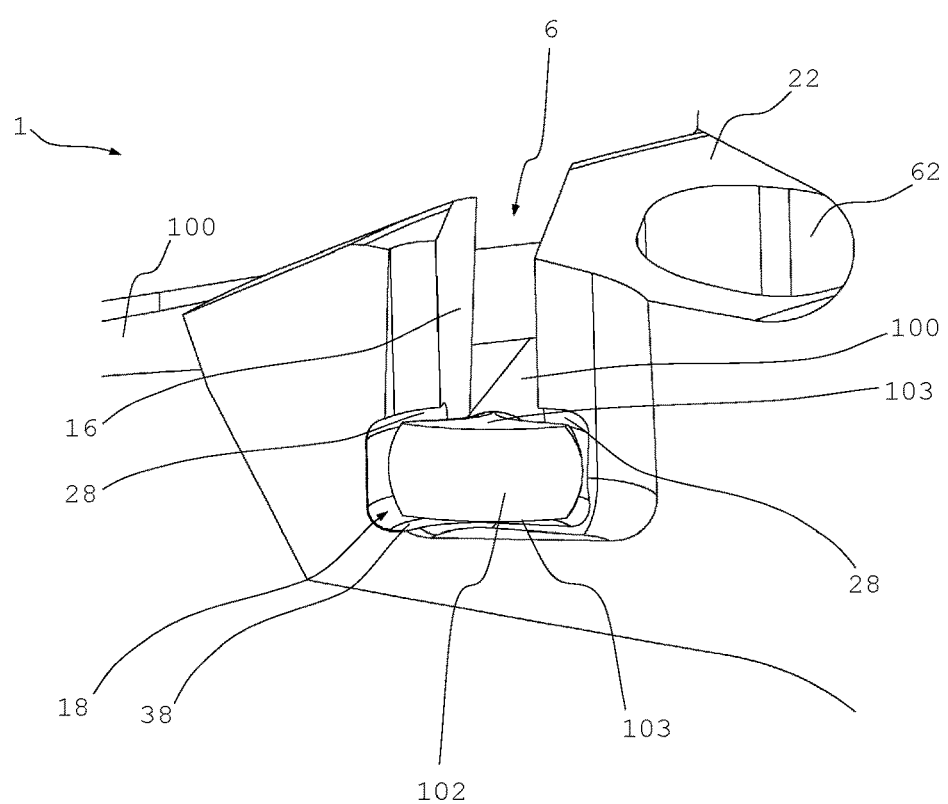
FIG. 8 a schematic detail view of the takeup space with a spoke placed therein in a cut-away perspective illustration.

At least one receiving pocket 8 showing at least one undercut 18 is disposed in the takeup spaces 7. This achieves a non-rotatable accommodation of the spoke head 102. The FIGS. 7 and 8 show in more detail a takeup space 7 comprising a receiving pocket 8.

The undercut 18 prohibits or largely inhibits an axial movement of the spoke head 102 accommodated therein. Moreover, the spoke 100 can no longer rotate or twist. This is particularly advantageous for blade spokes 104 whose aerodynamic advantages already deteriorate in the case of very minor twisting about their longitudinal axis.

The flattened spoke head 102 comprises two opposite side edges 103. When the spoke head 102 lies in the undercut 18, then these side edges 103 bear non-rotatably against opposite placing sections 28. The placing sections 28 are provided by the backwall 17 of the takeup space 7 and by the wall of the undercut 18 lying opposite the backwall 17.

The axially farther outwardly placing section 28 is broken in 2 separate sections by the spoke feed-through 6. Moreover, the receiving pocket 8 shows a curve that matches the curve of the spoke head 102. The pocket 8 also includes another placing section 38 that is opposite to the placing section 28. This ensures a precise seat of the spoke head 102 in the receiving pocket 8 so as to ensure a particularly even load on the spoke head 102 clamped into the wheel 200.

The spoke feed-throughs 5, 6 and the takeup spaces 7 and the depressions 62 and the sinks 521 are preferably worked into the hub body by milling out. The receiving pocket 8 is preferably worked into the hub flanges 2, 12 by form milling.

List of reference numerals:

| | |
|---|---|
| 1 | hub |
| 2 | hub flange |
| 3 | accommodation section |
| 4 | accommodation section |
| 5 | spoke feed-through |
| 6 | spoke feed-through |
| 7 | takeup space |
| 8 | receiving pocket |
| 11 | hub shell |
| 12 | hub flange |
| 15 | slotted hole |
| 16 | punched hole |
| 17 | backwall |
| 18 | undercut |
| 21 | axle |
| 22 | side face |
| 25 | crossing point |
| 27 | sidewall |
| 28 | placing section |
| 31 | brake accommodation |
| 32 | side face |
| 37 | ridge |
| 38 | placing section |
| 42 | peripheral line |
| 52 | top surface |
| 62 | depression |
| 100 | spoke |
| 101 | spoke body |
| 102 | spoke head |
| 103 | side edge |
| 104 | blade spoke |
| 114 | shaft section |
| 124 | shaft section |
| 200 | wheel |
| 201 | rim |
| 300 | bicycle |
| 301 | saddle |
| 302 | frame |
| 303 | handlebar |
| 304 | fork |
| 421 | offset |
| 521 | sink |

The invention claimed is:

1. A hub comprising:
a hub shell for rotatable arrangement relative to at least one axle received in the hub shell, wherein the hub shell includes at least one circumferential hub flange that accommodates and defines an orientation of a plurality of spokes, each of the plurality of spokes including a spoke body and a spoke head,
wherein the hub flange comprises a plurality of accommodation sections for receiving one spoke head each, and wherein each of the accommodation sections includes a spoke feed-through configured to enable one of the plurality of spokes to be guided into and out of the accommodation section, the hub flange comprises at least two different types of the accommodation sections,
a first type of the accommodation sections comprises a circumferentially closed spoke feed-through relative to the plurality of spokes, wherein at least a portion of an axial side face of the circumferentially closed spoke feed-through is closed to prevent one of the plurality of spokes in the first type of the accommodation sections from being removed in an axial outboard direction, and
a second type of the accommodation sections comprises a circumferentially opened spoke feed-through relative to the plurality of spokes that enables one of the plurality of spokes in the second type of the accommodation sections to be removed in an axial outboard direction,
wherein the first and second types of accommodation sections are disposed at least at one offset relative to a peripheral line of the hub flange, the offset being configured to form-fittingly block at least one of the plurality of spokes in the second-type accommodation section by way of at least one of the plurality of spokes in the first-type accommodation section against emerging from the opened spoke feed-through in the axial direction.

2. The hub according to claim 1, wherein the accommodation sections are only disposed on an axially outwardly surface of the hub flange.

3. The hub according to claim 1, wherein the first and second types of accommodation sections are disposed alternatingly over the at least one circumferential hub flange.

4. The hub according to claim 1, wherein the spoke feed-throughs of at least two of the accommodation sections disposed adjacent to one another comprise crossed longitudinal axes so that spokes accommodated therein can cross.

5. The hub according to claim 1, wherein the at least one circumferential hub flange comprises at least one sink at a top face.

6. The hub according to claim 5, wherein a deepest point of the at least one sink is disposed radially beneath a crossing point of the crossed longitudinal axes of the spoke feed-throughs.

7. The hub according to claim 1, wherein adjacent accommodation sections have spoke feed-throughs with crossing longitudinal axes, each comprising at least one depression in the at least one circumferential hub flange.

8. The hub according to claim 1, wherein the spoke feed-throughs of the first and second types of accommodation sections each extend over a top face of the hub flange and only over one of two axial side faces of the hub flange.

9. The hub according to claim 1, wherein the circumferentially opened spoke feed-through extends at least in part over a top face and over the axial side face of the hub flange where a pertaining one of the accommodation sections is disposed and wherein the circumferentially closed spoke feed-through extends at least partially over the top face and that axial side face of the hub flange which lies opposite the axial side face with the pertaining one of the accommodation sections.

10. The hub according to claim 9, wherein the length of a section of the circumferentially closed spoke feed-through on the top face is larger than the length of a section of the circumferentially opened spoke feed-through on the axial side face.

11. The hub according to claim 1, wherein the accommodation sections are at least partially disposed in at least one takeup space.

12. The hub according to claim 11, wherein the takeup space is configured axially open.

13. The hub according to claim 11, wherein the takeup space is enclosed by at least one axial backwall and by at least one at least partially circumferential sidewall.

14. The hub according to claim 13, wherein the sidewall provides a radially or tangentially extending ridge at least in sections.

15. The hub according to claim 11, wherein at least some of the accommodation sections are disposed singly in one takeup space each or wherein at least some of the accommodation sections are disposed in pairs in one takeup space each.

16. The hub according to claim 15, wherein the accommodation sections disposed in pairs in one takeup space comprise the first and second types of accommodation sections.

17. The hub according to claim 11, wherein in the takeup space at least one receiving pocket having at least one undercut is disposed which is configured to non-rotatably retain the spoke head.

18. The hub according to claim 17, wherein the receiving pocket comprises at least two opposite placing sections where an accommodated spoke head can be non-rotatably placed by one side edge each.

19. A wheel with a hub, the hub comprising:
a hub shell for rotatable arrangement relative to at least one axle received in the hub shell, wherein the hub shell includes at least one circumferential hub flange that accommodates and defines an orientation of a plurality of spokes, each of the plurality of spokes including a spoke body and a spoke head,
wherein the hub flange comprises a plurality of accommodation sections for receiving one spoke head each, and wherein each of the accommodation sections includes a spoke feed-through configured to enable one of the plurality of spokes to be guided into and out of the accommodation section, the hub flange comprises at least two different types of the accommodation sections,
a first type of the accommodation sections comprises a circumferentially closed spoke feed-through relative to the plurality of spokes, wherein at least a portion of an axial side face of the circumferentially closed spoke feed-through is closed to prevent one of the plurality of spokes in the first type of the accommodation sections from being removed in an axial outboard direction, and
a second type of the accommodation sections comprises a circumferentially opened spoke feed-through relative to the plurality of spokes that enables one of the plurality of spokes in the second type of the accommodation sections to be removed in an axial outboard direction,
wherein the first and second types of accommodation sections are disposed at least at one offset relative to a peripheral line of the hub flange, the offset being configured to form-fittingly block at least one of the plurality of spokes in the second-type accommodation section by way of at least one of the plurality of spokes in the first-type accommodation section against emerging from the opened spoke feed-through in the axial direction,
wherein the plurality of spokes is received on the hub and wherein at least one of the plurality of spokes in the first-type accommodation section crosses at least one of the plurality of spokes in the second-type accommodation section in at least one crossing point and wherein the at least one of the plurality of spokes in the first type accommodation section form-fittingly secures the at least one of the plurality of spokes in the second type accommodation section against leaving in the axial direction.

20. The wheel according to claim 19, wherein the plurality of spokes are configured as blade spokes having at least one cylindrical shaft section and at least one flattened shaft section and wherein the cylindrical shaft sections are located in the crossing point of the spokes.

21. A hub comprising:
a hub shell for rotatable arrangement relative to at least one axle received in the hub shell, wherein the hub shell includes at least one circumferential hub flange that accommodates and defines an orientation of a plurality of spokes, each of the plurality of spokes including a spoke body and a spoke head,
wherein the hub flange comprises a plurality of accommodation sections for receiving one spoke head each, and wherein each of the accommodation sections includes a spoke feed-through configured to enable one of the plurality of spokes to be guided into and out of the accommodation section,
wherein the accommodation sections are disposed at least at one offset relative to a peripheral line of the hub flange, the offset being configured to form-fittingly block at least one of the plurality of spokes in one of the accommodation sections by way of at least one of the plurality of spokes in another one of the accommodation sections against emerging from the opened spoke feed-through in the axial direction.

* * * * *